US006915880B2

(12) United States Patent
Swales

(10) Patent No.: US 6,915,880 B2
(45) Date of Patent: Jul. 12, 2005

(54) SHIELDED AIRCRAFT BRAKE ASSEMBLY

(75) Inventor: Philip Arnold Swales, Rugby (GB)

(73) Assignee: Dunlop Aerospace Limited (GB)

( * ) Notice: Subject to any disclaimer, the term of this patent is extended or adjusted under 35 U.S.C. 154(b) by 8 days.

(21) Appl. No.: 10/332,637

(22) PCT Filed: Jul. 16, 2001

(86) PCT No.: PCT/GB01/03202

§ 371 (c)(1),
(2), (4) Date: Jan. 9, 2003

(87) PCT Pub. No.: WO02/06693

PCT Pub. Date: Jan. 24, 2002

(65) Prior Publication Data

US 2004/0099490 A1 May 27, 2004

(30) Foreign Application Priority Data

Jul. 18, 2000 (GB) .............................................. 0017619
May 17, 2001 (GB) .............................................. 0112062

(51) Int. Cl.[7] ........................... B60T 1/06; B60B 37/00; B64C 25/42
(52) U.S. Cl. ..................... 188/18 A; 301/6.2; 244/111; 188/71.5; 188/264 A
(58) Field of Search .............................. 188/18 A, 71.5, 188/71.1, 71.6, 73.1, 218 XL, 264 A; 301/6.2, 6.3, 6.91; 244/111, 103 S

(56) References Cited

U.S. PATENT DOCUMENTS 3,887,041 A * 6/1975 Malone ...................... 188/71.5
3,972,395 A * 8/1976 Jannasch et al. ......... 188/251 A
4,503,944 A   3/1985 Burckhardt et al.
5,248,013 A * 9/1993 Hogue et al. ............ 188/264 G
5,759,622 A   6/1998 Stover
6,419,056 B1 * 7/2002 Dyko et al. .............. 188/264 G

FOREIGN PATENT DOCUMENTS

EP           0 555 822 A1    8/1993

OTHER PUBLICATIONS

Patent Abstract of Japan, vol. 1997, No. 04, Apr. 30, 1997 & JP 08 332682 A (Kusaka Kogyo KK), Dec. 17, 1996.

* cited by examiner

Primary Examiner—Xuan Lan Nguyen
(74) Attorney, Agent, or Firm—Caesar, Rivise, Bernstein, Cohen & Pokotilow, Ltd.

(57) ABSTRACT

An aircraft brake assembly incorporating components which are sensitive to heat and to contact with substances present in runway,.e.g., de-icer compositions and cleansing liquids. The assembly includes an external member to shield the components from the liquids. The external member may comprise a rigid or flexible, fluid-impermeable or porous material located to receive and retain the liquids. Heat generated through the use of the brake assembly may evaporate any liquid settled on the external member or at least discourage any liquid from settling thereon.

29 Claims, 3 Drawing Sheets

SHIELDED AIRCRAFT BRAKE ASSEMBLY

BACKGROUND OF THE INVENTION

1. Field of Invention

This invention relates generally to aircraft brake assemblies and more particularly to devices and methods for protecting aircraft brake assemblies from the deleterious effects of runway de-icer compositions and cleansing liquids.

2. Description of Related Art

Runway de-icers are used at airports during the winter months to ensure that the runway surfaces are maintained free of ice in the interest of aircraft safety. De-icers based on glycol liquids and urea have traditionally been used. These materials have been found to present a hazard to the environment (see Jane's Airport Review July/August 1996, page 42) and more environmentally benign formulations based on acetates and formates have recently been introduced.

It has been realised that exposure of carbon-carbon composites, e.g. brake discs, to contaminants such as runway de-icers and aircraft cleaning fluids can cause an increase in the oxidation rate of the composite at temperatures above about 450° C. There has been a marked increase in the oxidation rate since the introduction of environmentally friendly runway de-icers. A small amount of oxidation causes a dramatic reduction in the material strength and can even result in the failure of drive tenons, especially from the stator discs. Oxidation weight loss of only 5% can result in a loss of strength of approximately 25%.

Carbon-carbon composite materials will oxidise at temperatures above 450° C. in the absence of contact with de-icer or cleaning solutions but the oxidation rate is controlled by anti-oxidative protection applied to discs and is not found to be a problem during the service life of the brake. The relationship between the oxidation problem and de-icers is evidenced by the fact that the problem is worse in winter months than in summer months and in the case of aircraft regularly operating out of airports in cold climates.

Carbon-carbon composite brake discs are exposed to the runway de-icer spray as the aircraft takes off, lands and during taxiing. The spray runs into the brake assembly after splashing onto the exposed parts of the brake, such as the cylinder block, or spray containing the de-icer can be drawn into the brake by the airflow caused by cooling fans that cool the brakes after landing. The de-icer solution can seep into pores within the composite where it dries onto the material when the discs are at an elevated temperature, thereby contaminating them. This contamination can then act as a catalyst to accelerate oxidation at temperatures in excess of about 450° C., resulting in a reduction in service life of the brake discs.

EP-A1-0555822 describes the use of a cylindrical louvered heat shield mounted so as to rotate with an associated wheel. The heat shield is intended to prevent ingress of foreign objects, protecting an inner heat shield and the heat stack. Any impinging liquid is thrown off of the louvered heat shield as a consequence of its rotation.

It is one object of the invention to provide means to ameliorate or avoid the reduction in service life of carbon-carbon composite brake discs which results from contact with substances such as de-icers and cleaners that are used in airports, such as on runways.

BRIEF SUMMARY OF THE INVENTION

A first aspect of the invention resides in an aircraft brake assembly incorporating a heat stack which is sensitive to heat and to contact with substances present in runway de-icer compositions, cleansing fluids and like liquids, the assembly including shielding means mounted on an exterior surface of the heat stack at one end thereof to receive and retain, in use, impinging liquids to which the heat stack is sensitive.

A second aspect of the invention provides an aircraft brake assembly incorporating components which are sensitive to heat and to contact with substances present in runway de-icer compositions, cleansing fluids and like liquids, the assembly including external means to shield the components from the liquids; characterised in that the shielding means are adapted to receive and retain the liquids and are located to be heated by heat generated by the brakes to evaporate liquids received and retained in said shielding means.

A further aspect of the invention resides in an aircraft brake assembly incorporating components which are sensitive to heat and to contact with substances present in runway de-icer compositions, cleansing fluids and like liquids, the assembly including external means to shield the components from the liquids characterised in that the shielding means comprises a porous material located to receive and retain such liquids.

The shielding means may comprise a member formed of porous material which may be mounted in a support dimensioned to leave a portion of the porous member exposed in the likely path of splashed liquid. Preferably, the porous member is made of felt, a zeohite, matting, fabric or the like.

Typically, the sensitive components are carbon brake discs arranged in a heat stack. The shielding means may comprise a shielding member formed from a flexible or rigid material. In such a case, the shielding member may be mounted on the exterior surface of one end of the stack, e.g. on the pressure stator. A shielding member may be present at each end. The shielding member maybe porous or impermeable. The shielding means may be impregnated with reagents to neutralise or fix substances contained in liquids.

The assembly may further comprise a torque tube about which the shielding means may be mounted to prevent pooling of said liquids, in use, in the area of the torque tube. A shielding member formed from a flexible material will effect a good seal to the torque tube due to the material of which it comprises, whereas a rigid shielding member will preferably be machined to a high or, at least, a relatively high tolerance so as to provide a good fit about the torque tube.

If the shielding member is made from a porous, liquid absorbing material, a wide range thereof may be used, such as sponges, felts, matting, fabrics or the like. The shielding member can be made up of a single piece or a number of sections. The shielding member could be a single layer or made with multiple layers which may be the same or different. As the shielding member is positioned on an outside surface of the brake it does not reach the high temperatures experienced by discs located in the centre of the brake. However, it is important that the material selected for the shielding member is compatible with the service environment and service conditions.

In one preferred structure an annular layer of the shielding member is mounted between two plates dimensioned to leave an exposed area thereof, although other suitable retention means may be utilised, such as a single annulus, rivets, one or more brackets or the like.

Plates between which the shielding member is contained could be of a metallic material such as steel or of ceramic or other material compatible with the service environment and service conditions. Preferably the plates are arranged in sections which may be relatively moveable to allow for mismatching thermal rates of expansion. The plates need not be flat as stiffening webs or cooling fins could be incorporated. The plates, especially the outer plate, could be solid, relieved with holes or in the form of a mesh. Means may be present, e.g. wiper means or walls including channels and ducts may be shaped to direct liquids on to the shielding member.

A fourth aspect of the invention provides a method of shielding the components of an aircraft brake assembly which are sensitive to heat and to contact with substances present in runway de-icer compositions, cleaning fluids and like liquids, the method comprising mounting shielding means on the outside of the assembly at a location which will not substantially increase the temperature of the heat sensitive components; the method being characterised by receiving and retaining such liquids within the pores of a porous member which comprises the shielding means.

The shielding means is preferably mounted in the likely splash path of the liquid, and, additionally or alternately, it may be mounted in the path of flow of air into the brake assembly having fan cooling means.

Preferably, heat generated by the brakes is used to evaporate liquid received by the porous member and/or retained in the pores thereof.

A fifth aspect of the invention resides in a method of shielding the components of an aircraft brake assembly which are sensitive to heat and to contact with substances present in runway de-icer compositions, cleaning fluids and like liquids, the method comprising mounting shielding means on the outside of the assembly at a location which will not substantially increase the temperature of the heat sensitive components characterised by locating the shielding means on the exterior surface of one end of the heat stack of the aircraft brake assembly.

The shielding member held to one plate or between such plates could be attached to the outside (pressure) face of the pressure stator by fastening means such as riveting or by the use of joining techniques such as bonding. In a variation the shielding member is attached to any other conveniently located component, at one or both ends of the chassis.

It has been found that by using an aspect of the invention e.g. incorporating a porous member into the brake assembly, splashed de-icer or similar solution can be absorbed into the porous material before it comes into contact with the brake discs. During service, the heat of the brake during landing cycles dries the porous member to leave a residue in an otherwise dry porous member, allowing the porous member to again absorb liquids on repeated exposure. The porous member would be changed during routine servicing of the brake with the porous member, or the assembly containing the plates being replaced.

It is important that the shielding member contained within the shielding means is mounted at a position where contaminants will be encountered. It is a particular object of the invention to prevent the pooling of liquids in the torque tube area, where pools of contaminants are known to build up. These pools of contaminant liquid can soak into the stator disc tenons and lead to increased and accelerated oxidation thereof.

In order that the invention maybe well understood it will now be described with reference to the accompanying diagrammatic drawings in which:

DETAILED DESCRIPTION OF THE INVENTION

Figure 1:
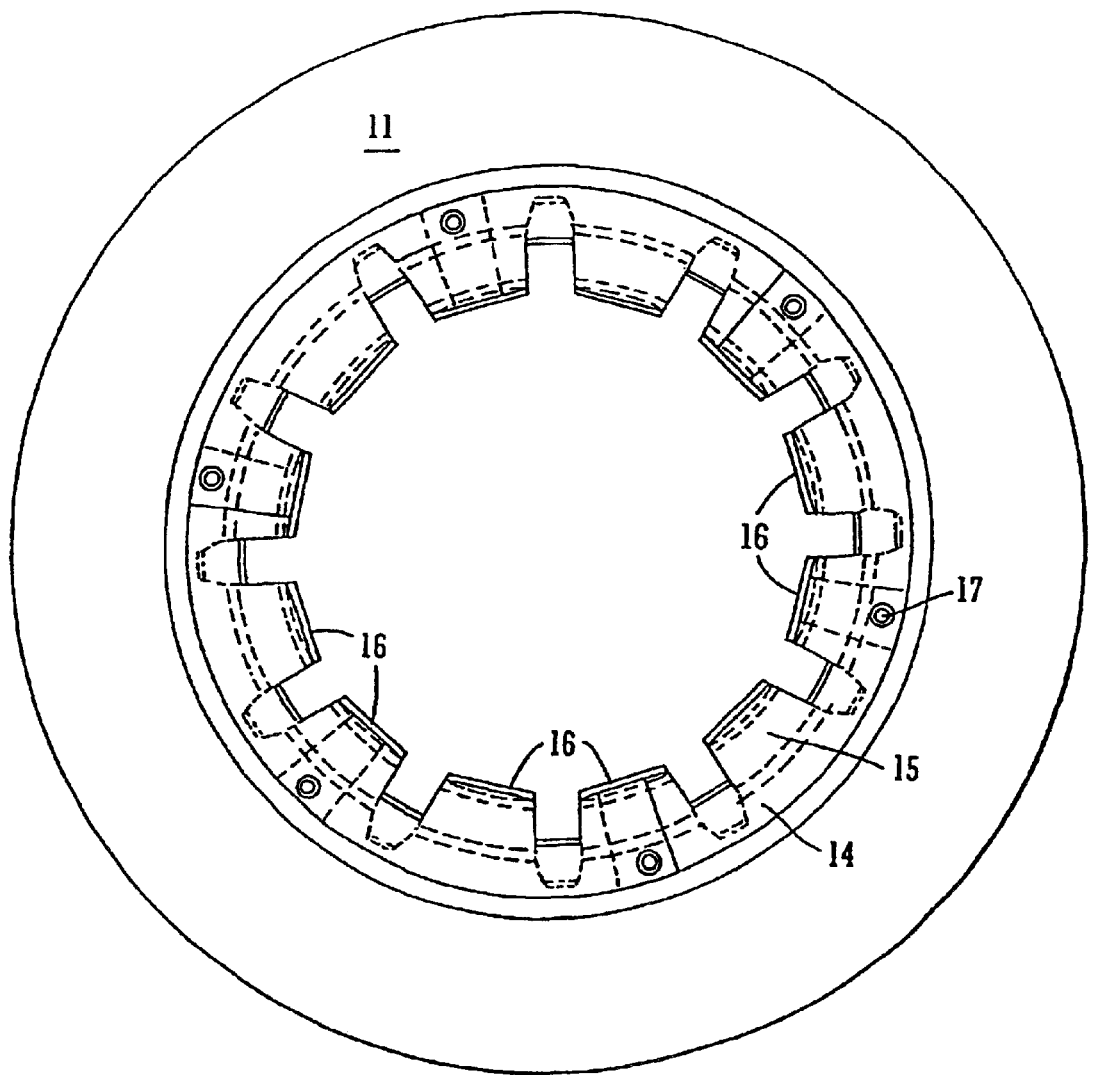
FIG. 1 is an end elevation of one end stator of the brake assembly of the invention.
Figure 3:
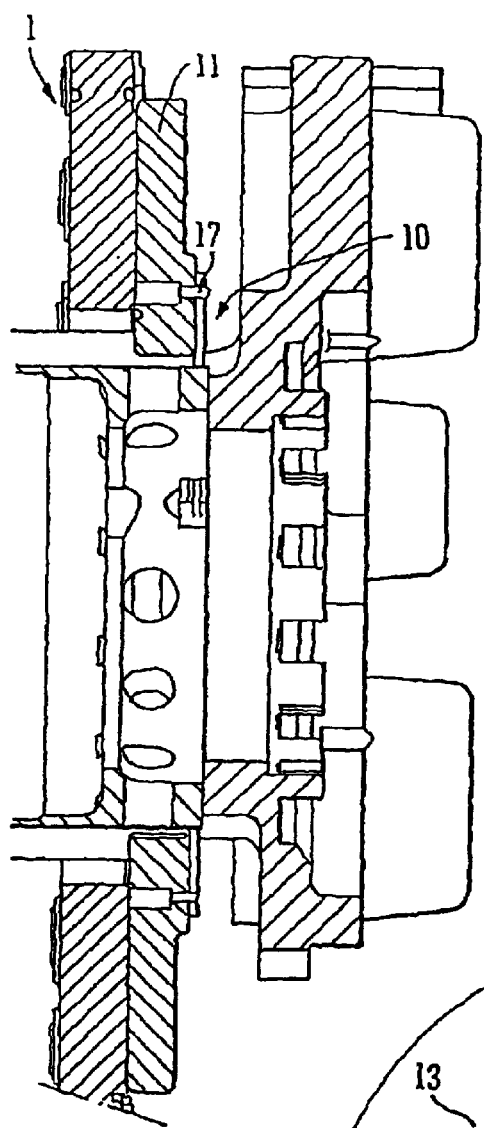
FIG. 3 is a sectional view of the assembly.
Figure 2:
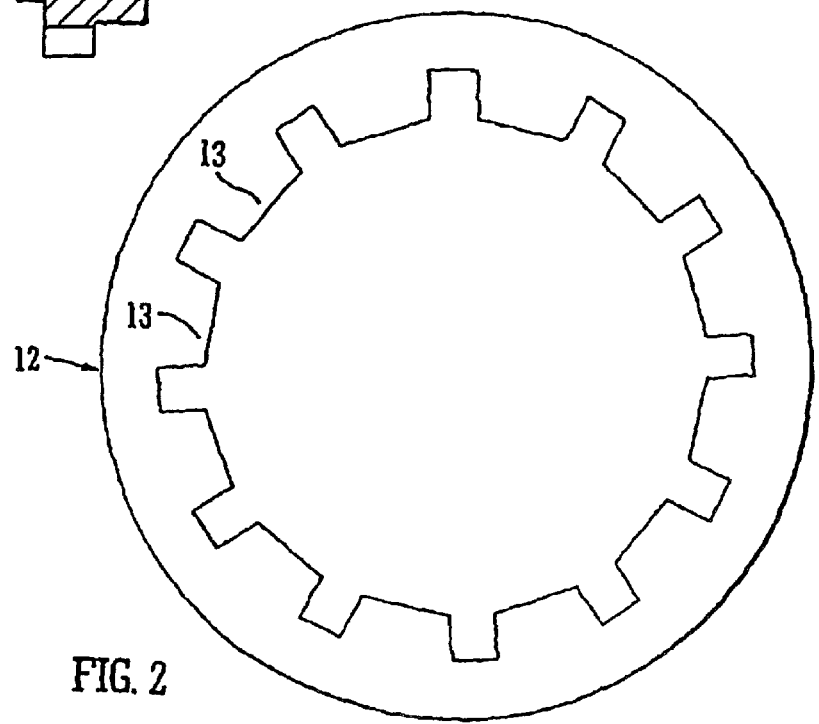
FIG. 2 is a side elevation of the shielding member.
Figure 4:
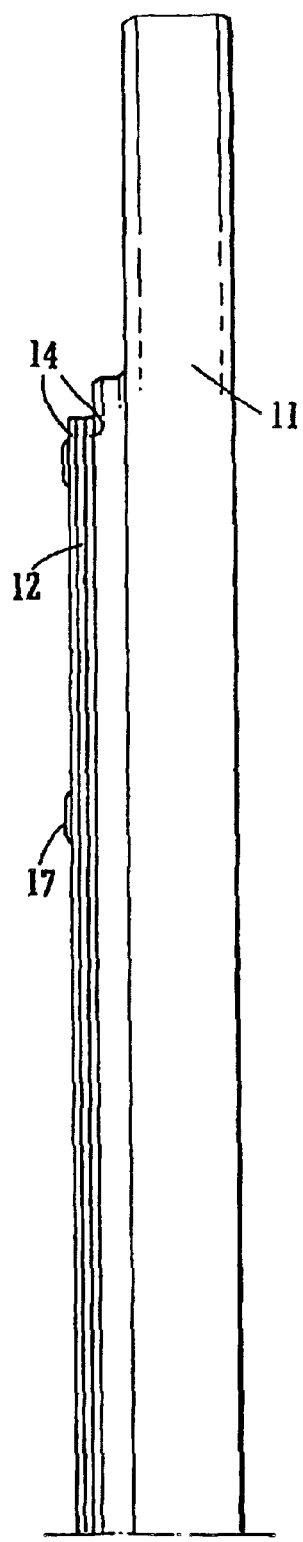
FIG. 4 is a partial sectional view drawn to an enlarged scale.

A typical brake assembly 1 has the usual annular heat stack of interleaved stator and rotor discs made of carbon-carbon composite. A shield assembly 10 is mounted on the exterior surface at an end (or both ends) of the stack; as shown in FIG. 1 the assembly is mounted on the pressure stator 11. The assembly comprises an annular body or member 12, smaller in diameter than the pressure stator 11 and having radially spaced apart castellations 13. The body 12 is formed of a liquid absorbent material which can withstand the conditions of use. Suitable materials are SAVERGUARD E GLASS NEEDLEMAT NGM-06-120 or, alternatively, a carbonised, carded staple fibre sheet, such as DMS757, a proprietary material manufactured by Dunlop Aerospace Limited.

Alternatively, the body 12 may be formed from a fluid-impermeable material which acts as a physical barrier, such as a metallic material, e.g. steel, or alternatively a ceramic material. Such materials are nominally rigid and are machined to at least a relatively high tolerance.

The body 12 may also comprise a flexible material such as a glass-fibre or other fabric, such as those previously disclosed, so as to effect a good seal between the components.

A plate 14 of the same general shape is fitted over each side of the body 12, and its castellations 15 are dimensioned to leave a marginal portion 16 of the body exposed. The plate is built up of three sections adjacent ends of which overlap, as shown, to allow for movement caused by differential thermal expansion. The plates 14 and body 12 are held to the pressure stator 11 by rivets 17.

In use, any liquid sprayed on to the brake assembly will reach the exposed margins 16 of the body 12 and will be kept away from the carbon-carbon composite discs.

In the case of an absorbent body 12, as the brakes heat up, the heat will cause the liquid to evaporate from the absorbent material leaving the contaminant solids behind. The material is then free to take up more liquid. On servicing the absorbent body 12 will be replaced.

The fluid-impermeable member, from which the body 12 may also be composed will also heat up during use of the brakes. The heating thereof, will discourage liquid from settling thereon or thereabout. Acting as a physical barrier it (the body 12) will prevent pooling of contaminant liquid in the torque tube area. The rigid, fluid-impermeable member, will be able to be riveted direct to the pressure stator of a heat stack, without recourse to further retention means. If desired further retention means may be used.

The invention is not limited to a shield of the size or position shown and a shield covering a larger portion of the pressure stator disc outer face is envisaged. Moreover, the body 12 need not be sandwiched between plates 14 as other retention means such as one or more brackets, a single annulus riveted to the pressure stator, either through the body 12 or not, or other means known to the skilled addressee.

Further, a porous body 12 may be mounted at any suitable location so as to intercept any impinging liquids which would otherwise have contacted the heat stack.

What is claimed is:

1. An aircraft brake assembly incorporating a heat stack which is sensitive to heat and to contact with substances present in runway de-icer compositions and cleansing liquids, the heat stack having an end, the assembly comprising shielding means formed of a porous material mounted on an exterior surface of the heat stack at the end of the stack to receive and retain, in use, impinging said compositions and liquids, within the pores of said porous material, to which the heat stack is sensitive.

2. An aircraft brake assembly according to claim 1 wherein the shielding means is adapted to effect the evaporation of the impinging liquids retained therein by heat generated by the brakes.

3. An assembly according to claim 2, wherein said shielding means comprises a member formed of said porous material.

4. An assembly according to claim 3, wherein the member formed of said porous material is mounted in a support dimensioned to leave a portion of the member exposed in the path of an impinging liquid.

5. An assembly according to claim 3, wherein the porous member is made of felt, a zeolite, matting, or fabric.

6. An assembly according to claim 2, wherein the sensitive components are carbon-carbon brake discs arranged in a heat stack.

7. An assembly according to claim 6, wherein the end of the stack includes said exterior surface and wherein the shielding means is mounted on said exterior surface of the end of the stack at a location where it will experience heat generated by the brakes in use.

8. An assembly according to claim 2 further comprising a torque tube, wherein said shielding means is mounted about the torque tube to prevent pooling of said liquids, in use, in the area of the torque tube.

9. An assembly according to claim 1, wherein said shielding means comprises a member formed of said porous material.

10. An assembly according to claim 9, wherein the member formed of said porous material is mounted in a support dimensioned to leave a portion of the member exposed in the path of an impinging liquid.

11. An assembly according to claim 9, wherein the porous member is made of felt, a zeolite, matting, or fabric.

12. An assembly according to claim 1 further comprising a torque tube, wherein said shielding means is mounted about the torque tube to prevent pooling of said liquids, in use, in the area of the torque tube.

13. An assembly according to claim 1, wherein the sensitive components are carbon-carbon brake discs arranged in a heat stack.

14. An assembly according to claim 13, wherein said heat stack includes a pressure stator and the shielding means is mounted on the pressure stator, at a location where it will experience heat generated by the brakes in use.

15. An aircraft brake assembly incorporating components which are sensitive to heat and to contact with substances present in runway de-icer compositions and cleansing fluids, the assembly including external means to shield the components from the liquids, said shielding means comprising a porous material through which air is flowable to cool the components, the porous material being located to receive and retain said compositions and liquids, within the pores of said porous material, in use.

16. An assembly according to claim 15 further comprising a torque tube, wherein said shielding means is mounted about the torque tube to prevent pooling of said liquids, in use, in the area of the torque tube.

17. An assembly according to claim 15, wherein the end of the stack includes said exterior surface and wherein the shielding means is mounted on the exterior surface of the end of the stack at a location where it will experience heat generated by the brake discs in use.

18. A method of shielding the components of an aircraft brake assembly which are sensitive to heat and to contact with substances present in runway de-icer compositions, and cleansing liquids, the brake assembly having an outside, the method comprising providing shielding means comprising a porous member, mounting the shielding means on the outside of the assembly in a manner which will not substantially increase the temperature of the heat sensitive components and, when in use, enables receiving and retaining said compositions and liquids, within the pores of said porous material.

19. A method according to claim 18, including the step of mounting the shielding means in the path of an impinging liquid.

20. A method according to claim 18, wherein the brake assembly has cooling fan means and wherein the method includes the step of mounting the shielding means in the path of flow of air into the brake assembly.

21. A method according to claim 18 further comprising using heat generated by the brakes to evaporate impinging liquid received and retained in the open spaces.

22. A method of shielding the components of an aircraft brake assembly which are sensitive to heat and to contact with substances present in runway de-icer compositions, and cleansing liquids, the brake assembly having a heat stack with an exterior surface having an end, the method comprising: providing shielding means comprising a porous member having pores, mounting the shielding means on the exterior surface of the end of the heat stack in a manner which will not substantially increase the temperature of the heat sensitive components and, when in use, receiving and retaining said compositions and liquids within the pores of the porous member.

23. An aircraft brake assembly incorporating a heat stack which is sensitive to heat and to contact with substances present in runway de-icer compositions and cleansing liquids, the heat stack having an end, the assembly comprising shielding means mounted on an exterior surface of the heat stack at the end of the stack and including plural open spaces through which air is flowable to cool the heat stack and to receive and retain, in use, impinging said compositions and liquids within the open spaces of said shielding means to which the heat stack is sensitive.

24. An aircraft brake assembly according to claim 23 wherein the shielding means is adapted to effect the evaporation of the impinging liquids retained therein by heat generated by the brakes.

25. An assembly according to claim 23, wherein said shielding means comprises a member formed of a porous material.

26. An assembly according to claim 25, wherein the member formed of said porous material is mounted in a support dimensioned to leave a portion of the member exposed in the path of an impinging liquid.

27. An assembly according to claim 25, wherein the porous member is made of felt, a zeolite, matting, or fabric.

28. An assembly according to claim 23, wherein the sensitive components are carbon-carbon brake discs arranged in a heat stack.

29. An assembly according to claim 28, wherein the heat stack includes a pressure stator and the shielding means is mounted on the pressure stator at a location where it will experience heat generated by the brakes in use.

* * * * *